United States Patent [19]

Strybel

[11] 4,092,865
[45] June 6, 1978

[54] FLUID-TEST APPARATUS

[75] Inventor: Richard V. Strybel, Elk Grove Village, Ill.

[73] Assignee: Gould Inc., Cleveland, Ohio

[21] Appl. No.: 699,537

[22] Filed: Jun. 24, 1976

[51] Int. Cl.² .............................................. G01L 7/00
[52] U.S. Cl. ....................................... 73/756; 137/861
[58] Field of Search ........................... 73/420, 422 GC; 137/557, 608

[56] References Cited

U.S. PATENT DOCUMENTS

| 1,265,953 | 5/1918 | Pittman | 73/115 |
|---|---|---|---|
| 1,797,591 | 3/1931 | Sartakoff | 73/420 |
| 2,355,270 | 8/1944 | Campbell | 137/608 X |
| 2,821,210 | 1/1958 | Liley | 137/608 X |
| 2,936,000 | 5/1960 | Mason | 73/420 X |
| 3,050,126 | 8/1962 | Lebeaux et al. | 137/608 X |

Primary Examiner—Richard C. Queisser
Assistant Examiner—John S. Appleman
Attorney, Agent, or Firm—Wegner, Stellman, McCord, Wiles & Wood

[57] ABSTRACT

An improved fluid-test apparatus having a plurality of hose connectors one of which is made to provide a flow capacity at least substantially equal to the cumulative flow capacity of a plurality of others of such connectors. The disclosed apparatus includes valves associated with each of the respective connectors, and in the illustrated embodiment, four such connectors and valves are provided. Gauges are further associated with the apparatus to have fluid communication with a manifold chamber within the apparatus body. At least one of the valves for controlling the hose connections to the manifold chamber may also be used for controlling the connection of the gauge to the manifold chamber. At least one of the gauges may have continuous fluid communication with at least one of the hose connections at all times.

6 Claims, 13 Drawing Figures

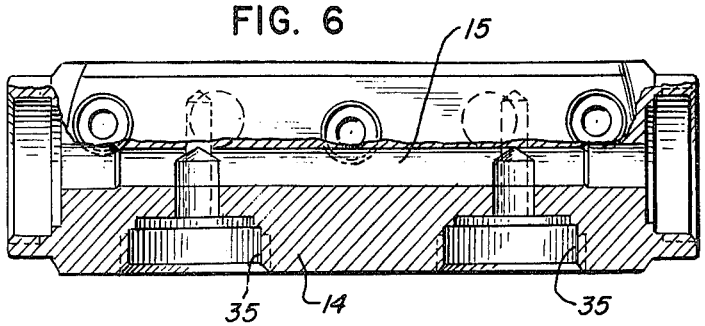
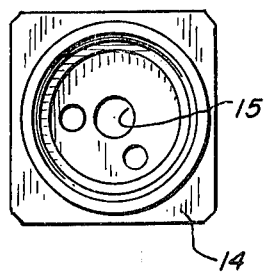
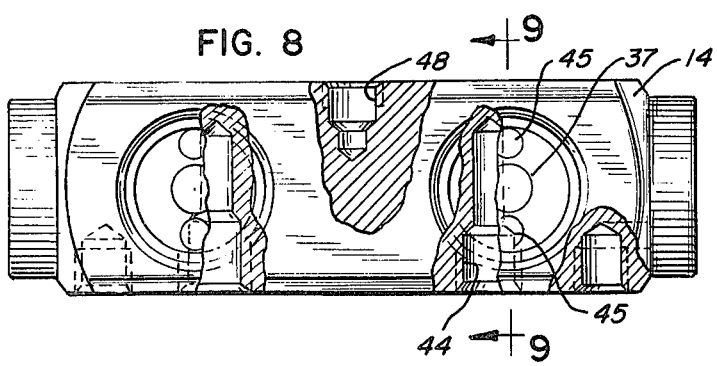
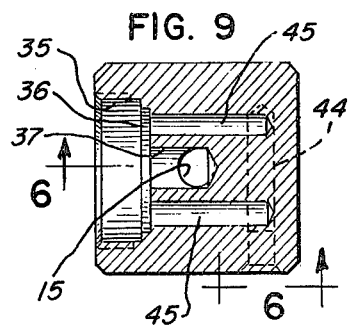
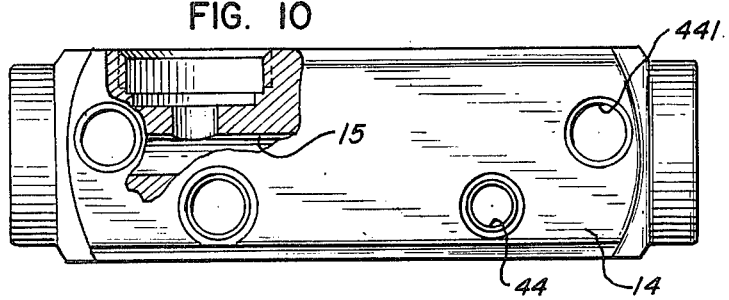
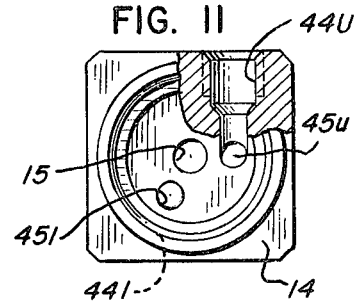
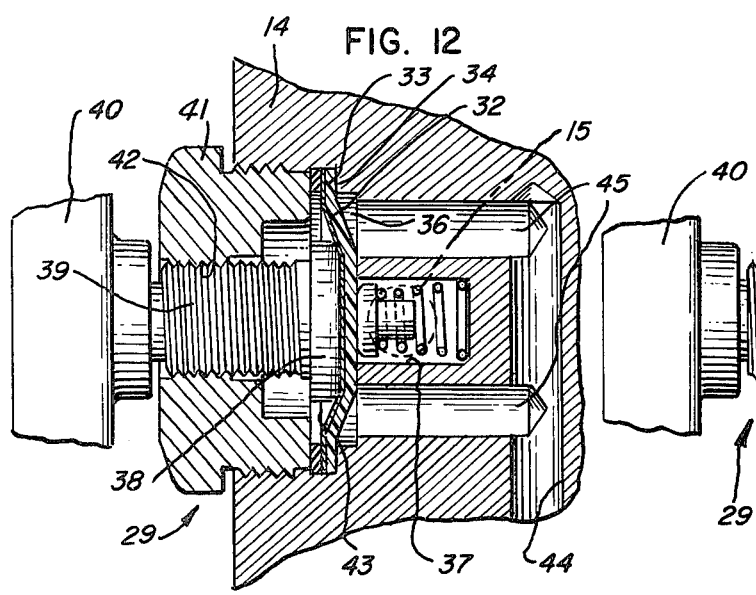
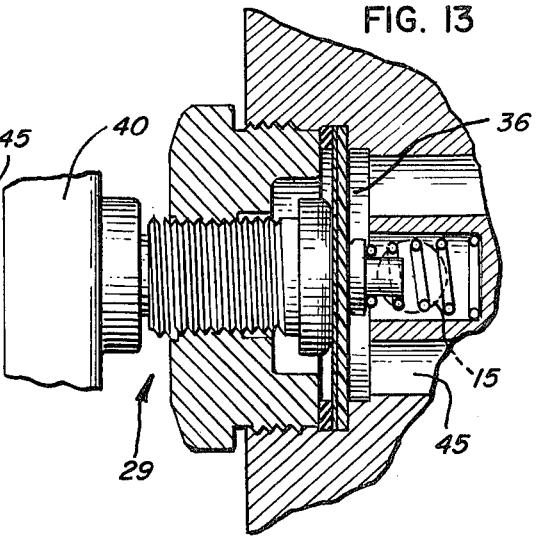

FLUID-TEST APPARATUS

BACKGROUND OF THE INVENTION

1. Field of the Invention

This invention relates to fluid-test apparatus and in particular to fluid-test apparatus having a manifold and gauge means to which a plurality of fluid ducts may be connected.

2. Description of the Prior Art

In U.S. Pat. No. 3,438,260, of Leonard J. Kowal et al, which patent is owned by the assignee hereof, a fluid-test apparatus is disclosed having a manifold provided with a plurality of flexible hoses connected thereto. The manifold further includes gauge means for indicating a condition of the fluid in the manifold chamber. A pair of valves is provided for controlling flow of fluid in a plurality of the connections to the manifold chamber. Three flexible hoses are associated with the apparatus for connection thereof to a fluid system to be tested.

Another form of gauge connection having means for connecting hoses thereto is shown in U.S. Pat. No. 2,212,466, of Robert L. Bradford. Weaver R. Wells, in U.S. Pat. No. 2,238,958, shows a refrigerant testing device wherein a plurality of gauges are connected to a plurality of threaded connectors defined by a plurality of tubular elements which are, in turn, connected.

Another testing manifold having a plurality of gauges, valves, and hose connecting means is illustrated in U.S. Pat. No. 3,118,463, of Rollin H. Lacart.

SUMMARY OF THE INVENTION

The present invention comprehends an improved fluid-test apparatus providing further facilitated testing of fluid systems, such as refrigeration systems, in a novel and simple manner.

More specifically, the present invention comprehends a fluid-test apparatus having a large flow capacity vacuum connector for concurrently handling fluid delivery from both the high and low side lines of the refrigeration system for facilitated testing thereof.

To provide further improved facilitated testing, the present fluid-test apparatus includes a manually operable valve for controlling fluid communication between each of the hose connections and an internal manifold chamber of the apparatus.

The gauge means of the apparatus may have selective communication with the manifold chamber through the valve means of the apparatus, and in the illustrated embodiment, at least one of the hose connection valve means further serves as the means for providing controlled communication of the gauge means with the manifold chamber.

The apparatus may be arranged so as to have one or more of the gauges in fluid communication at all times with one or more of the hose connections upstream of the valve associated therewith so that the valve controls communication concurrently of the hose connection and the gauge with the manifold chamber.

In the illustrated embodiment, two gauges are provided having respective controlled communication with the manifold chamber through two different hose connection control valves.

The fluid-test apparatus of the present invention is extremely simple and economical of construction while yet providing the improved functioning and highly desirable features discussed above.

BRIEF DESCRIPTION OF THE DRAWING

Other features and advantages of the invention will be apparent from the following description taken in connection with the accompanying drawing wherein:

FIG. 6 is a top plan view of the manifold body with a portion broken away to illustrate the internal construction thereof;

FIG. 7 is a lefthand end elevation thereof;

FIG. 8 is a front elevation thereof with portions broken away to illustrate further internal construction thereof;

FIG. 9 is a transverse section taken substantially along the line 9—9 of FIG. 8;

FIG. 10 is a bottom plan view with a portion broken away to illustrate a portion of the internal construction thereof;

FIG. 11 is a righthand end elevation thereof with a portion broken away to illustrate the internal construction thereof;

FIG. 12 is a fragmentary enlarged vertical section of a valve portion of the apparatus taken substantially along the line 12—12 of FIG. 4 with the valve shown in the closed condition; and FIG. 13 is a fragmentary section similar to that of FIG. 12 but with the valve shown in the open position.

DESCRIPTION OF THE PREFERRED EMBODIMENT

Figure 1:
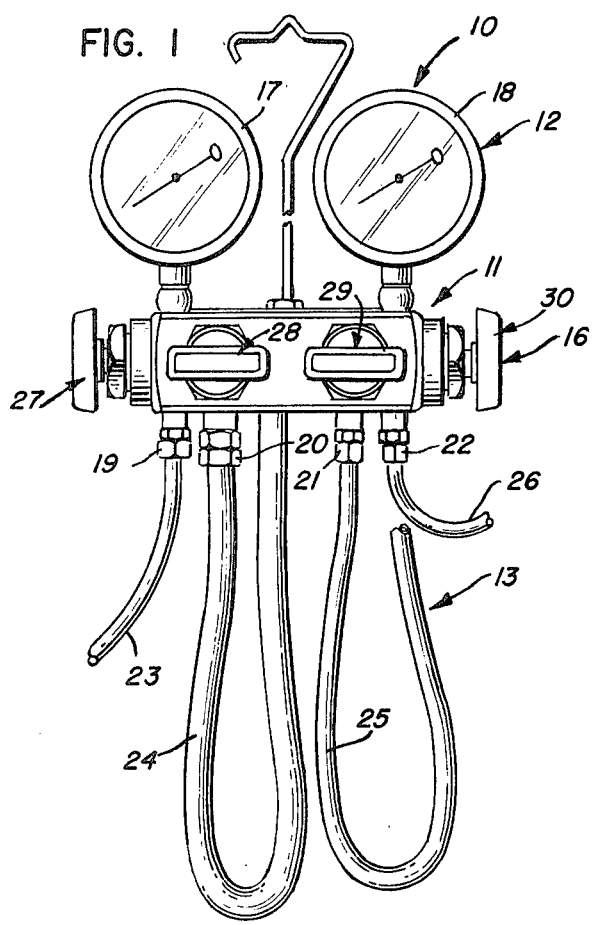
FIG. 1 is a front elevation of a fluid-test apparatus embodying the invention.
Figure 2:
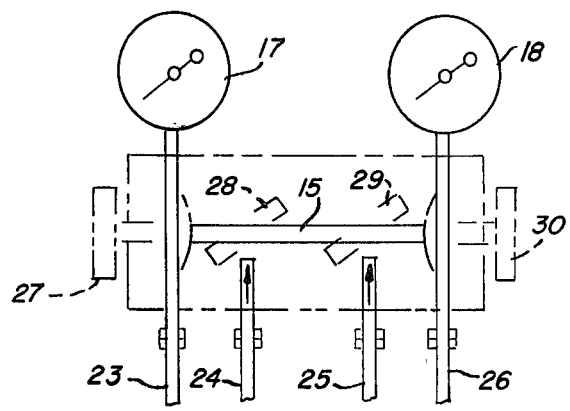
FIG. 2 is a schematic view illustrating a closed condition of the valves thereof.
Figure 3:
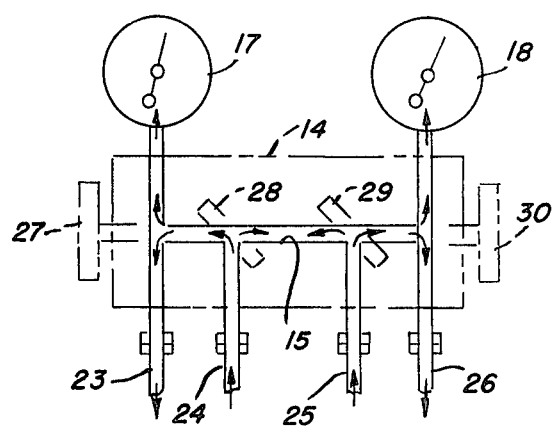
FIG. 3 is a shcematic view illustrating an open condition of the valves thereof.

In the exemplary embodiment of the invention as disclosed in the drawing, a fluid-test apparatus generally designated 10 is shown to include a manifold generally designated 11, a plurality of gauge means generally designated 12, and a plurality of hose connections generally designated 13. The manifold is defined by a body 14 having an internal manifold chamber 15. A plurality of valve means generally designated 16 is provided for selectively controlling communication between the hose connections 13 and the manifold chamber 15.

In the illustrated embodiment, gauge means 12 includes a pair of gauges 17 and 18. Hose connections 13 include four hose connectors 19, 20, 21 and 22, and four hoses 23, 24, 25 and 26 connected respectively to connections 19, 20, 21 and 22.

Valve means 16 includes four valves 27, 28, 29 and 30 for controlling respectively fluid communication between the manifold chamber 15 and the hose connectors 19, 20, 21 and 22. In the illustrated embodiment, valves 27 and 30 further control communication between the gauges 17 and 18 and the manifold chamber 15.

Figure 5:
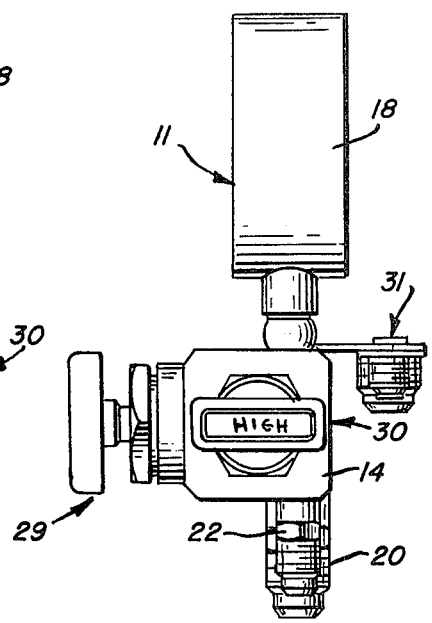
FIG. 5 is a side elevation thereof.

As shown in FIG. 5, the manifold may be provided with a blind fitting device generally designated 31 for connection thereto of the distal end of the hoses when the fluid-test apparatus is not in use.

Figure 4:
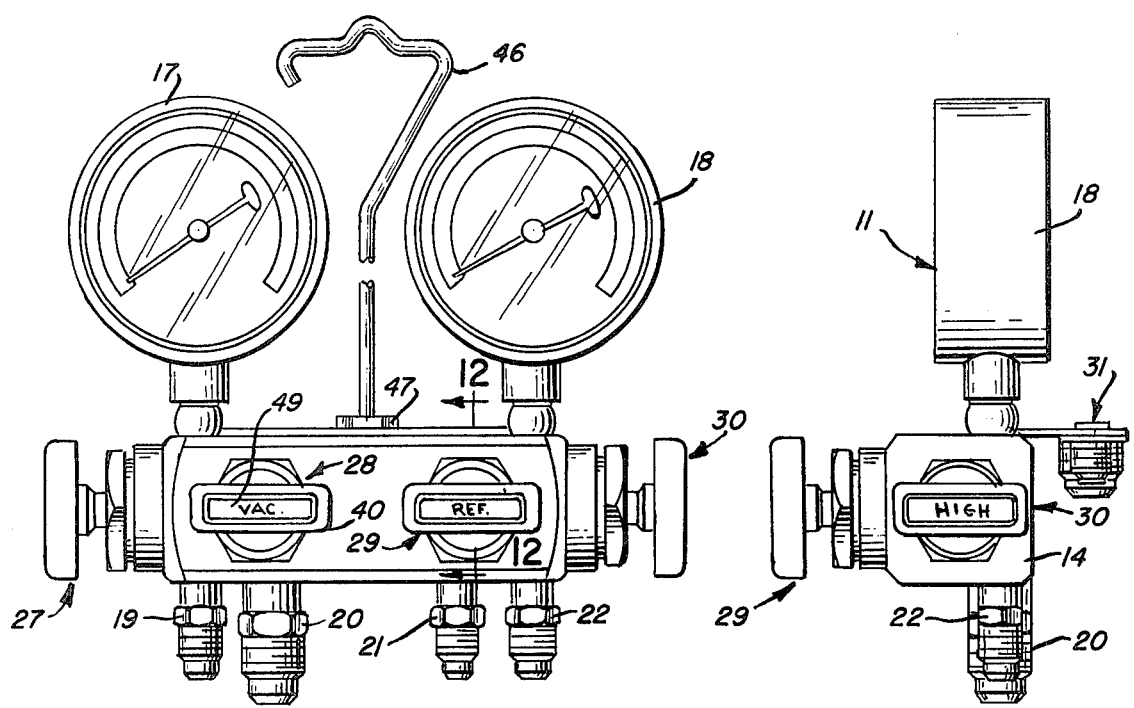
FIG. 4 is an enlarged front elevation of a portion of the apparatus.

As best seen in FIG. 4, hose connector 20 defines a vacuum connector which is larger than hose connectors 19, 21 and 22. More specifically, in the illustrated embodiment, the flow capacity of connector 20 is made to be at least approximately twice the flow capacity of the other hose connectors. As also seen in FIG. 1, hose 24 is larger than the other hoses, and in the illustrated embodiment, has a flow capacity of at least approximately twice that of the other hoses. Thus, where the hose 24 is utilized as a vacuum connection hose, concurrent flow from each of the hoses 23 and 26, which may be respectively connected to the high and low sides of the refrigeration system, may be effected for facilitated improved system servicing and testing.

As indicated briefly above, fluid communication between the respective connectors and the manifold chamber 15 is selectively controlled by the corresponding manually operable valves 27, 28, 29 and 30. As illustrated in FIGS. 12 and 13, the respective valves may comprise diaphragm valves. As the valves are similar, a description of valve 29 as shown in FIG. 12 is applicable to each of the other valves. Thus, more specifically, the valve includes a flexible diaphragm 32 having a peripheral portion 33 sealingly urged against a shoulder 34 at the inner end of a recess 35 opening outwardly in the valve body 14. Inwardly of the diaphragm 32, the recess defines a valve chamber 36. As shown in FIG. 6, the manifold chamber 15 comprises a cylindrical chamber extending longitudinally of the manifold body. The manifold body is provided with an inner recess 37 extending inwardly from the valve chamber 36 and intersecting the manifold chamber 15, as shown in FIG. 12. When the valve is closed, the diaphragm 32 is urged sealingly across the recess 37.

To effect such a closed condition of the valve, the diaphragm is urged inwardly by a movable valve member 38 carried on a threaded stem 39 to the outer end of which is attached a handle 40. A mounting cap 41 is threadedly secured in the recess 35 and is provided with a central passage 42 for coaxially threadedly mounting the valve stem 39. An annular seal 43 may be provided extending between the cap 41 and the peripheral portion 33 of the diaphragm for effectively sealing the diaphragm to the manifold body.

The hose connections may have communication with the manifold chamber 15 through the recess 37 when the valve is in an open condition, such as shown in FIG. 13. To provide such communication, the manifold body is provided with an outer passage 44 extending inwardly from the hose connector, and an inner passage 45 extending from the outer passage 44 into communication with the valve chamber 36. As shown in FIG. 12, a pair of such inner passages may be provided for improved communication between the outer passage 44 and the valve chamber 36.

Thus, when the valve is in the open condition of FIG. 13, communication between the associated hose connector and the manifold chamber is provided. Such controlled communication is effected by suitable manipulation of the handle 40 of the valve and, as indicated above, inasmuch as each of the hose connections is provided with its own associated valve, improved facilitated control and servicing of the refrigeration system may be readily effected.

As shown in FIGS. 7 and 11, respectively, the inner passages of the valve connections at the opposite ends of the manifold body are angularly related to the axial centerline of the manifold chamber 15 in contradistinction to the inline arrangement thereof in connection with the valves 28 and 29, as illustrated in FIG. 8. Thus, as shown in FIG. 11, the upper inner passage 45u at the righthand end of the manifold body associated with valve 30 is disposed rearwardly horizontally of the manifold chamber 15 and communicates with a vertically upwardly opening outer passage 44u to which gauge 18 is connected. The lower inner passage 45l is spaced clockwise from passage 45u approximately 120° and communicates with a downwardly opening outer passages 44l to which connector 22 is connected.

As shown in FIG. 7, the lefthand end of the valve body is mirror image of the righthand end.

As further shown in FIG. 4, the manifold 11 may be supported by a hanger 46 which is secured to the manifold body by a threaded connector 47 received in a threaded recess 48 in the upper surface of the manifold body.

As further shown in FIG. 4, the handles 40 of the respective valves may be provided with identification means 49. More specifically, valve 27 may be provided with an identification plate reading "Low", valve 28 may be provided with an identification plate reading "Vac", valve 29 may be provided with an identification plate reading "Ref", and valve 30 may be provided with an idendification plate reading "High". Correspondingly, gauge 17 may comprise a low reading gauge and gauge 18 may comprise a high reading gauge in conformity with the requirements for the particular use to which the apparatus is to be put.

As shown, the handles 40 comprise T-shaped handles providing facilitated manipulation of the valve member 38 and thereby providing further improved facilitated testing and servicing of the fluid system. The valves may be readily serviced by the removal of the retainer cap 41 permitting the withdrawal of the seal 43 and diaphragm 32 and subsequent servicing or replacement as desired.

Thus, the invention comprehends an improved fluid-test apparatus construction wherein each of the hose connections is individually controlled by manually operable valve means and wherein communication of the gauges with the manifold chamber is controlled additionally by the hose connection valve means. Further, the gauges are connected to the hose connections in such a manner as to permit the gauges to have fluid communication with one or more of the hose connections at all times irrespective of the arrangement of the associated hose connection valve. While the apparatus provides such highly improved facilitated functioning, it is relatively compact and inexpensive and thus provides a substantial improvement in the fluid-test apparatus art.

The foregoing disclosure of specific embodiments is illustrative of the broad inventive concepts comprehended by the invention.

I claim:

1. In a fluid-test apparatus such as for use in testing a refrigeration system having a high pressure side and a low pressure side, said apparatus having a body defining a manifold chamber, the improvement comprising: first connector means having a first manually operable valve for selectively providing a first fluid communication through said body to said manifold chamber; second connector means having a second manually operable valve for selectively providing a second fluid communication through said body to said manifold chamber; third connector means having a third manually operable valve for selectively providing a third fluid communication through said body to said manifold chamber; fourth connector means having a fourth fluid communication through said body to said manifold chamber; and gauge means for indicating a fluid condition communicating with said manifold chamber, each of said connector means including a connector fitting secured to said body, means defining a passage in said body extending between the connector fitting and the manually operable valve to be closed by the valve when the valve is in a closed condition and to have communication with the manifold chamber when the valve is in an open condition, the connector fitting and passage of one of said connector means having a preselected flow capacity at least the cumulative flow capacity of the connector fitting and passage of at least two of the other connector means, the manually operable valves of each of said connector means comprising similar size diaphragm valves permitting flow of fluid serially through said one connector means and a parallel connection of at least two of the other connecting means with effectively maximum cumulative flow permitted by said at least two other connecting means whereby application of a vacuum to said one connector means permits concurrent full capacity evacuation of the low and high sides of the refrigeration system through two of the other connector means respectively.

2. The fluid-test apparatus of claim 1 further including a fourth valve arranged to provide a fluid connection between said fourth connector means and said gauge at all times.

3. The fluid-test apparatus of claim 1 wherein said gauge means is arranged to be in fluid communication with at least one connector means at all times.

4. The fluid-test apparatus of claim 1 wherein saud gauge means includes a first gauge connected to said body to have fluid communication with said manifold chamber through said first valve, and a fourth valve a second gauge means connected to said body to have fluid communication with said manifold chamber through said fourth valve.

5. The fluid-test apparatus of claim 1 wherein said valves define movable valve members disposed internally of said body for controlling fluid flow through said passages.

6. The fluid-test apparatus of claim 1 wherein said valve means are provided with T-shaped handles.

* * * * *